US008209570B2

(12) United States Patent
Zhongjun et al.

(10) Patent No.: US 8,209,570 B2
(45) Date of Patent: Jun. 26, 2012

(54) APPARATUS AND METHOD FOR RECEIVING DIGITAL VIDEO SIGNALS

(75) Inventors: Wang Zhongjun, Singapore (SG); Ting Yujing, Singapore (SG); Ding Yong, Singapore (SG); Tomisawa Masayuki, Singapore (SG)

(73) Assignee: Oki Techno Centre (Singapore) Pte Ltd, Singapore (SG)

( * ) Notice: Subject to any disclaimer, the term of this patent is extended or adjusted under 35 U.S.C. 154(b) by 1348 days.

(21) Appl. No.: 11/836,135

(22) Filed: Aug. 8, 2007

(65) Prior Publication Data

US 2008/0063079 A1 Mar. 13, 2008

(30) Foreign Application Priority Data

Sep. 12, 2006 (SG) .............................. 200606233-5

(51) Int. Cl.
*H04N 7/64* (2006.01)

(52) U.S. Cl. ....................................................... 714/708

(58) Field of Classification Search ................... 714/708
See application file for complete search history.

(56) References Cited

U.S. PATENT DOCUMENTS

| | | | | |
|---|---|---|---|---|
| 4,979,174 | A * | 12/1990 | Cheng et al. | 714/774 |
| 6,084,919 | A * | 7/2000 | Kleider et al. | 375/285 |
| 6,154,489 | A * | 11/2000 | Kleider et al. | 375/221 |
| 6,625,776 | B1 * | 9/2003 | Wright et al. | 714/774 |
| 6,636,568 | B2 * | 10/2003 | Kadous | 375/225 |
| 6,674,820 | B1 * | 1/2004 | Hui et al. | 375/346 |
| 6,680,682 | B2 * | 1/2004 | Arnaud et al. | 341/155 |
| 6,756,872 | B2 * | 6/2004 | Penther | 335/229 |
| 6,823,005 | B1 * | 11/2004 | Chuang et al. | 375/227 |
| 6,834,079 | B1 * | 12/2004 | Strait et al. | 375/232 |
| 6,944,244 | B2 * | 9/2005 | Belotserkovsky et al. | 375/350 |
| 6,996,194 | B2 * | 2/2006 | Pukkila et al. | 375/340 |
| 7,002,900 | B2 * | 2/2006 | Walton et al. | 370/208 |
| 7,027,533 | B2 * | 4/2006 | Abe et al. | 375/341 |
| 7,050,402 | B2 * | 5/2006 | Schmidl et al. | 370/252 |
| 7,054,354 | B2 * | 5/2006 | Gorokhov et al. | 375/148 |
| 7,079,516 | B2 * | 7/2006 | You et al. | 370/337 |
| 7,095,812 | B2 * | 8/2006 | Chan et al. | 375/341 |
| 7,099,409 | B2 * | 8/2006 | Yousef | 375/340 |
| 7,110,350 | B2 * | 9/2006 | Li et al. | 370/204 |
| 7,158,568 | B2 * | 1/2007 | Park et al. | 375/233 |
| 7,167,535 | B2 * | 1/2007 | Sachse et al. | 375/375 |
| 7,200,191 | B2 * | 4/2007 | Geraniotis et al. | 375/340 |
| 7,203,459 | B2 * | 4/2007 | Goldstein et al. | 455/67.11 |
| 7,216,267 | B2 * | 5/2007 | Santraine et al. | 714/709 |
| 7,277,493 | B2 * | 10/2007 | Lai | 375/260 |
| 7,281,174 | B1 * | 10/2007 | Tapp et al. | 714/701 |
| 7,295,637 | B2 * | 11/2007 | Papathanasiou et al. | 375/347 |
| 7,295,645 | B1 * | 11/2007 | El-Ghoroury et al. | 375/345 |
| 7,302,231 | B2 * | 11/2007 | Sun | 455/63.1 |

(Continued)

FOREIGN PATENT DOCUMENTS

CN 1153430 A 7/1997

(Continued)

*Primary Examiner* — Stephen Baker
(74) *Attorney, Agent, or Firm* — Rabin & Berdo, P.C.

(57) ABSTRACT

An apparatus is operable to receive a digital video signal transmitted over a channel and comprises an operational module configured to operate in a first mode of operation and in a second mode. The apparatus is configured to switch operation of the operational module from the first mode to the second mode in dependence of an estimate of an environment (condition) of the channel.

20 Claims, 3 Drawing Sheets

U.S. PATENT DOCUMENTS 7,321,564 B2 * 1/2008 Ikram et al. .................. 370/252
7,382,829 B2 * 6/2008 Takizawa et al. ............ 375/238
7,386,057 B2 * 6/2008 Ito et al. ........................ 375/267
7,463,703 B2 * 12/2008 McElwain .................... 375/341
7,486,722 B2 * 2/2009 Brommer et al. ............ 375/222
7,486,728 B2 * 2/2009 Park .............................. 375/233
7,551,679 B2 * 6/2009 Liu et al. ....................... 375/260
7,558,223 B2 * 7/2009 Shirakata et al. ............ 370/280
7,616,695 B1 * 11/2009 Sarrigeorgidis .............. 375/260
7,656,970 B1 * 2/2010 Sankabathula et al. ....... 375/316
7,773,699 B2 * 8/2010 Jia et al. ........................ 375/341
7,783,958 B1 * 8/2010 Eidson et al. ................. 714/780
7,895,503 B2 * 2/2011 Walton et al. ................. 714/774
2004/0174939 A1 * 9/2004 Wang ............................ 375/316
2006/0018410 A1 * 1/2006 Onggosanusi et al. ....... 375/340

FOREIGN PATENT DOCUMENTS

CN 1270482 A 10/2000
CN 1402924 A 3/2003
CN 1617531 A 5/2005
CN 1682451 A 10/2005
KR 20060025350 A 3/2006

* cited by examiner

APPARATUS AND METHOD FOR RECEIVING DIGITAL VIDEO SIGNALS

BACKGROUND OF THE INVENTION

1. Field of the Invention

The present invention relates to an apparatus and method for receiving transmitted digital video signals and operation of digital devices/terminals.

2. Description of Related Art

Use of digital video signals such as digital television (DTV) services via terrestrial broadcasting has gained momentum worldwide recently. One of the attractive features of DTV is its capability to deliver content to mobile terminals or handheld devices. For a mobile DTV device, especially a handheld one, however, low power consumption is desirable for obtaining reasonable usage and standby cycles. Mobility is another requirement such that access to services is possible not only at indoor and outdoor locations but also when the user is on the move, for example, when in a vehicle. To some extent, these two requirements are mutually exclusive. In order to provide high quality services in a highly mobile environment, the devices are implemented with sophisticated signal processing algorithms for mitigating adverse transmission channel effects, which, of course, result in considerably increased power consumption. Therefore, the application of effective power consumption reduction schemes in the implementation of a mobile and/or handheld digital television terminal/device is highly desirable.

Various schemes for power consumption reduction have been proposed in the area of digital terrestrial broadcasting. A particularly well-known scheme is the so-called time-slicing technique adopted in the European Digital Video Broadcasting-Handheld (DVB-H) specification, described in more detail in "Digital video broadcasting (DVB); transmission system for handheld terminals (DVB-H)", ETSI EN 302 304 V1.1.1 (2004-11), "Digital video broadcasting (DVB); DVB specification for data broadcasting", ETSI EN 301 192 V1.4.1 (2004 November), "Digital video broadcasting (DVB); DVB-H implementation guidelines", ETSI TR 102 377 V1.1.1 (2005 February), European Telecommunications Standards Institute, and also in G. Faria, J. A. Henriksson, E. Stare, and P. Talmola, "DVB-H: Digital Broadcast Services to Handheld Devices," Proc. IEEE, Vol. 94, January 2006, pp. 194-209. The DVB-H system is defined based on its parent Digital Video Broadcast-Terrestrial (DVB-T) standard for fixed and mobile/handheld reception of digital TV signals. The use of time-slicing is mandatory in DVB-H and it can reduce the average power in the receiver front-end significantly—up to 90% to 95% in comparison with its DVB-T counterpart.

The power saving made possible by the time-slicing technique in DVB-H comes from the fact that essentially only those parts of the moving picture experts group (MPEG) transport stream (TS) which carry the currently selected data of the service have to be processed. Thus, service multiplexing can be performed solely in a time-division multiplex (TDM). The data of one particular service are therefore not transmitted continuously—as shown in FIG. 1*a*—but in compact periodical bursts with interruptions in between—as shown in FIG. 1*b*. This type of signal can be received time-selectively; the terminal/device synchronises to the bursts of the selected service but switches to a power-save mode during an intermediate time period when other services are being transmitted.

To perform the time-slicing in a DVB-H system properly, bursts entering the receiver have to be buffered and read out of the buffer at the service data-rate. The amount of data contained in one burst needs to be sufficient for bridging the power-save period of the front-end. The position of the bursts is signaled in terms of the relative time difference between two consecutive bursts of the same service. Practically, the duration of one burst (on-time 2 in FIG. 1*b*) is in the range of several hundred milliseconds whereas the power-save time (off-time 4 of FIG. 1*b*) may amount to several seconds. A lead time for powering up the front end, for resynchronisation and so on has to be taken into account; this time period is assumed to be less than 250 ms in DVB-H case.

In general, and referring again to FIG. 1, the TDM based power saving can be measured as the ratio of the power-save time between bursts, relative to the on-time 2 required for the reception of an individual service, i.e., $$\eta \approx \left[1 - \frac{S_b / C_b + t_s}{S_b / C_l}\right] \times 100\% \qquad (1)$$

Where $S_b$ is the burst size in bits, $C_b$ is the burst data-rate in bit-per-second (bps), $C_1$ is the expected service data-rate (continuously transmitted with lower rate) in bps of a handheld device, while $t_s$ is the lead time in seconds.

In a DVB-H system, the burst size $S_b$=2 Mbits, the maximum burst transmission rate is around $C_b$=10 Mbps, and the required lead time is about $t_s$=250 ms. In this case, the off-time 4 is around 4 s. Thus, for a typical service data-rate of $C_1$=384 kbps, about $\eta$=91% power saving can be achieved. This makes it feasible for a handheld device to provide a DTV service.

A similar power saving scheme has also been proposed for use in the Digital Multimedia Broadcasting-Terrestrial (DMB-T) system, which is a candidate for becoming or partially becoming the digital terrestrial television (DTT) broadcast standard in some countries: e.g. China, see China Patent No. 00123597.4, publication date: Mar. 21, 2001, and also Z-X. Yang, M. Han, C-Y. Pan, J. Wang, L. Yang, and A-D Men "A Coding and Modulation Scheme for HDTV Services in DMB-T," IEEE Trans. Broadcasting, Vol. 50, March 2004, pp. 26-31. The technique tailored for power saving in DMB-T is called frame-slicing, which is disclosed in China Patent Application No. 200410009721.5, publication date: Oct. 29, 2004. A significant difference between time-slicing and frame-slicing is that the former is realised in the link layer (i.e., the layer above the physical layer) whereas the latter is realised purely in the physical layer.

As shown in FIG. 2, DMB-T adopts a hierarchical frame structure 6. A basic frame element is called a Signal Frame 8. The Frame Group 10 is defined as a group of signal frames 8 with the first frame specially defined as Frame Group Header 12. The Super Frame 14 is defined as a group of Frame Groups 10. The top of the frame structure is called a Calendar Day Frame 16. The physical channel is periodical and synchronised with the absolute time as depicted by time markers 18*a*, 18*b*.

One of the features which differentiate DMB-T from other DTT devices is its adoption of the time-domain synchronous multi-carrier transmission technique referred to as TDS-OFDM. As depicted in FIG. 2, a signal frame 8 consists of two parts: Frame Sync 20 and Frame Body 22. The TDS-OFDM inserts pseudo-random number (PN) sequences 24 and their cyclical extensions as the guard intervals, which also serve for synchronisation and channel estimation. This time-domain synchronous technique can achieve fast frame and symbol timing acquisition with the theoretical lead time, $t_s$, of only about 2 ms, which is desirable for TDM-based power saving schemes, as can be seen from equation (1). The signal frame 8 also comprises an IDFT Block 26.

As shown in FIG. 2, the frame-slicing power saving scheme for DMB-T is to form a number of frame slices 28, each with a certain number of successive signal frames 8 which belong to the same frame group 10. Typically, a frame slice 28 consists of four signal frames 8. The frame-slicing scheme is different from the time-slicing scheme, which is purely dependent on the arrangement for on-off transmission in the link layer, whereas the frame-slicing scheme is physical layer based. This gives some flexibility in controlling the burst period and the power-saving period. Obviously, the burst size can be chosen to be the size of a frame slice 28. When a signal frame 8 is of 625 μs long, the duration of a frame slice 28 is 2.5 ms. In this case, the burst data-rate of $C_b$=24 Mbps, the burst size is found to be $S_b$=60 Kbits. Taking into consideration a lead time of $t_s$=2 ms and following equation (1), one may find that, in this case, for a service data-rate of $C_1$=384 kbps, approximately $\eta$=97% power saving can be achieved.

From the above discussion, it is apparent that both time-slicing and frame-slicing are passive schemes which gain power savings at the price of decreased service data rates.

SUMMARY OF THE INVENTION

An object of the present invention is to provide an apparatus and method for receiving digital video signals to achieve a high power saving efficiency while maintaining a certain level of quality of service.

The invention is defined in the independent claims. Some optional features of the invention are defined in the dependent claims. Embodiments provide an active solution, which can be applied either on top of time-slicing or frame-slicing schemes or simply as a stand-alone design feature for reducing the power consumption of digital video devices or terminals. Embodiments of the apparatus have particular application for digital television signals. Digital television apparatus may make use of specific features of the broadcasting system such as simplex transmission and its error tolerance for motion pictures.

Embodiments of the apparatus propose an environment-adaptation scheme for reducing power consumption of digital terrestrial television (DTT) devices/terminals. The scheme is applicable to both regular DTT terminals and handheld devices. The power saving is achieved in embodiments by run-time replacing complicated operations with simpler ones in one or more receiver modules when the transmission channel is found to be good for signal transmission. The assessment of channel condition is performed by real-time monitoring of the activities of an error-detector such as an RS decoder, which is commonly adopted in DTT systems. In embodiments, the assessment process is systematically parameterised in a unique way such that robust power savings can be achieved.

DETAILED DESCRIPTION OF THE INVENTION

The preferred embodiment of the present invention will be described in detail by way of following examples and with reference to the above-mentioned figures.

The above analysis on time-slicing and frame-slicing power reduction schemes show that a high burst data-rate, $C_b$ in equation (1), is necessary for both time-slicing and frame-slicing schemes to achieve the required power saving efficiency. Also, to maintain a certain level of quality of service (QoS), the required high $C_b$ should be always achievable independent of channel environment (or channel quality) variations. Together, in practice, these requirements imply that the system architecture design and the choice of related algorithms should make the high-rate transmission workable under the worst channel conditions such as a fast fading environment (with larger Doppler frequency shift—a significant problem for mobile devices).

Figure 1:
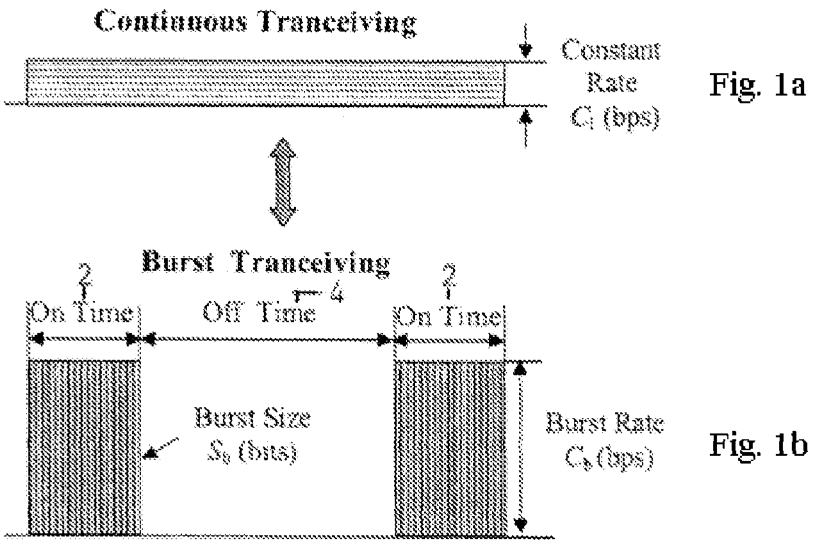
FIG. 1 illustrates the concept of a TDM-based power savings scheme.
Figure 2:
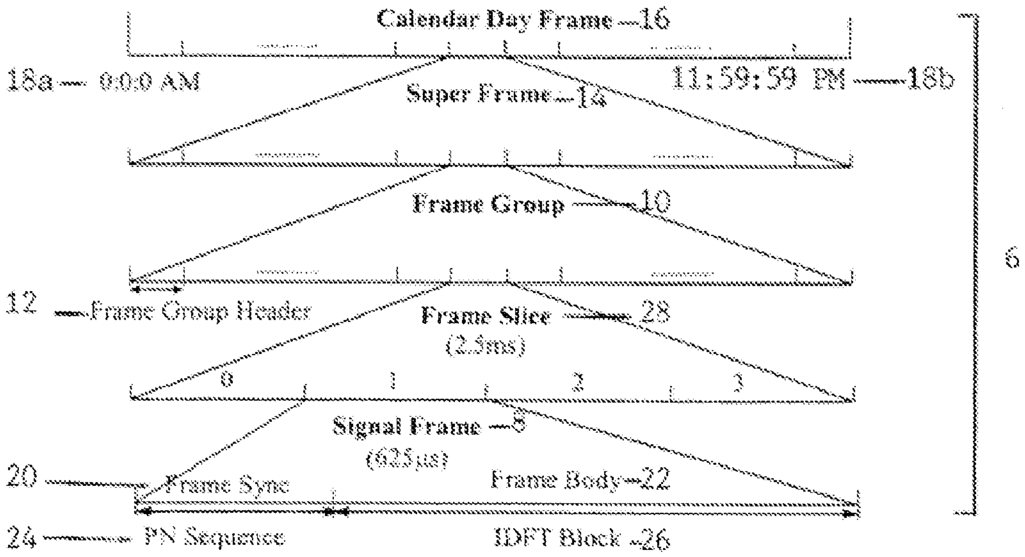
FIG. 2 illustrates a hierarchical frame structure of DMB-T.
Figure 3:
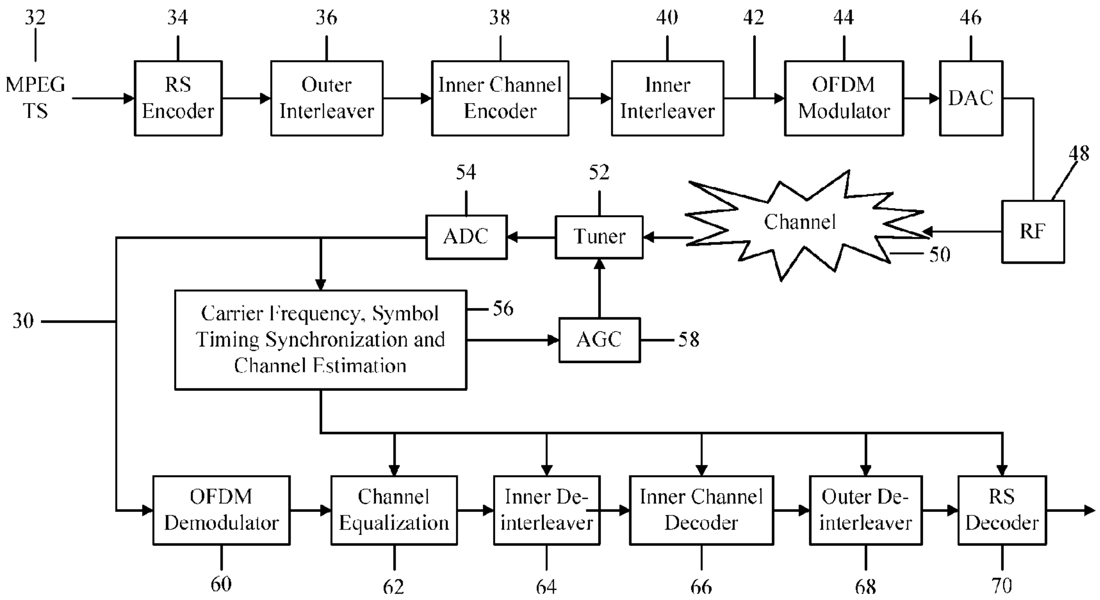
FIG. 3 illustrates a simplified block diagram of a DTT transceiver.

FIG. 3 depicts a simplified architecture 30 of a DTT transceiver. At the transmitter side, the MPEG TS 32 is first encoded by a Reed Solomon (RS) outer encoder 34. An outer interleaver 36 is deployed such that its receiving counterpart—outer de-interleaver 68—spreads the possibility of burst errors from the inner channel decoder 66.

After that, the bit streams will be encoded by an inner channel encoder 38 such as a convolutional coder, Turbo coder or Turbo-like coder. The coded bits are then sent to an inner interleaver 40. The resulting interleaved bit streams 42 are mapped to phase shift keying (PSK) or quadrature amplitude modulation (QAM) constellations (not shown). Finally, these constellation mapped symbols, are used to form the orthogonal frequency division multiplexing (OFDM) signal frames by an OFDM Modulator 44.

The transmitter also comprises a digital-to-analogue converter (DAC) 46 and a RF transmitter 48 for transmitting the transmission signal over a channel 50 to the receiver.

At the receiver side, the reverse operations of the transmitter are performed with some additional processing blocks such as automatic gain control (AGC), synchronisation and channel estimation for handling the noisy and multipath fading channel environments. As illustrated in FIG. 3, the receiver comprises an RF tuner 52, an analogue-to-digital converter (ADC) 54, a block 56 for carrier frequency, symbol timing synchronisation and channel estimation, automatic gain control 58, an OFDM demodulator 60, channel equalization 62, an inner de-interleaver 64, an inner channel decoder 66, an outer de-interleaver 68 and an RS decoder 70.

If one considers $P_{ALL}=P_{RF}+P_{BB}$ to be the overall power consumption of a regular DTT receiver (i.e., the device may not implement a TDM-based power reduction scheme), and $P_{RF}$ and $P_{BB}$ be the power consumed by the RF tuner 52 and the baseband processor (not shown), respectively. The required power consumption for a handheld device becomes:

$$P_{HA} \approx \frac{(S_b/C_b + t_s)(P_{RF} + P_{BB})}{S_b/C_t} \quad (2)$$

Since DTV broadcasting is mainly in downlink transmission, it can be assumed that $P_{RF}$ only varies with the AGC 58 control in adaptation to variations of actual channel 50 environment. In the baseband part, however, the situation is quite different. Processing complexity and, thus, required power consumption, $P_{BB}$, are usually design-dependent and become fixed after realisation. Thus, $P_{BB}$ can be regarded as independent on the channel variations. Obviously, by default, the baseband processor would operate at its highest level of $P_{BB}$ as the design and implementation of baseband demodulator and decoder need to take account of the worst channel condition. Taking into consideration the fact that $P_{RF}$ and $P_{BB}$ occupy almost an equal proportion of the overall power in a regular OFDM-based DTT system, it becomes necessary to reduce further $P_{BB}$ such that the required power consumption, $P_{ALL}$, of a regular device, or, $P_{HA}$, of a handheld device is minimized. Following equation (2), when the required $P_{BB}$ of a regular DMB-T device goes down from 800 mW to 500 mW, for example, $P_{HA}$ will be down to 30 mW from 40 mW.

Given a high target of $C_b$, operational module control algorithms which are usually of high complexity are most likely selected for achieving robust receiving under less-than-ideal channel conditions. The channel estimation algorithm, for example may need to be enhanced for fast fading channel conditions in a mobile environment. These enhanced algorithms, which are usually computationally expensive, are actually redundant in situations such as when the user is slowly moving (e.g., pedestrian) and even still.

Figure 4:
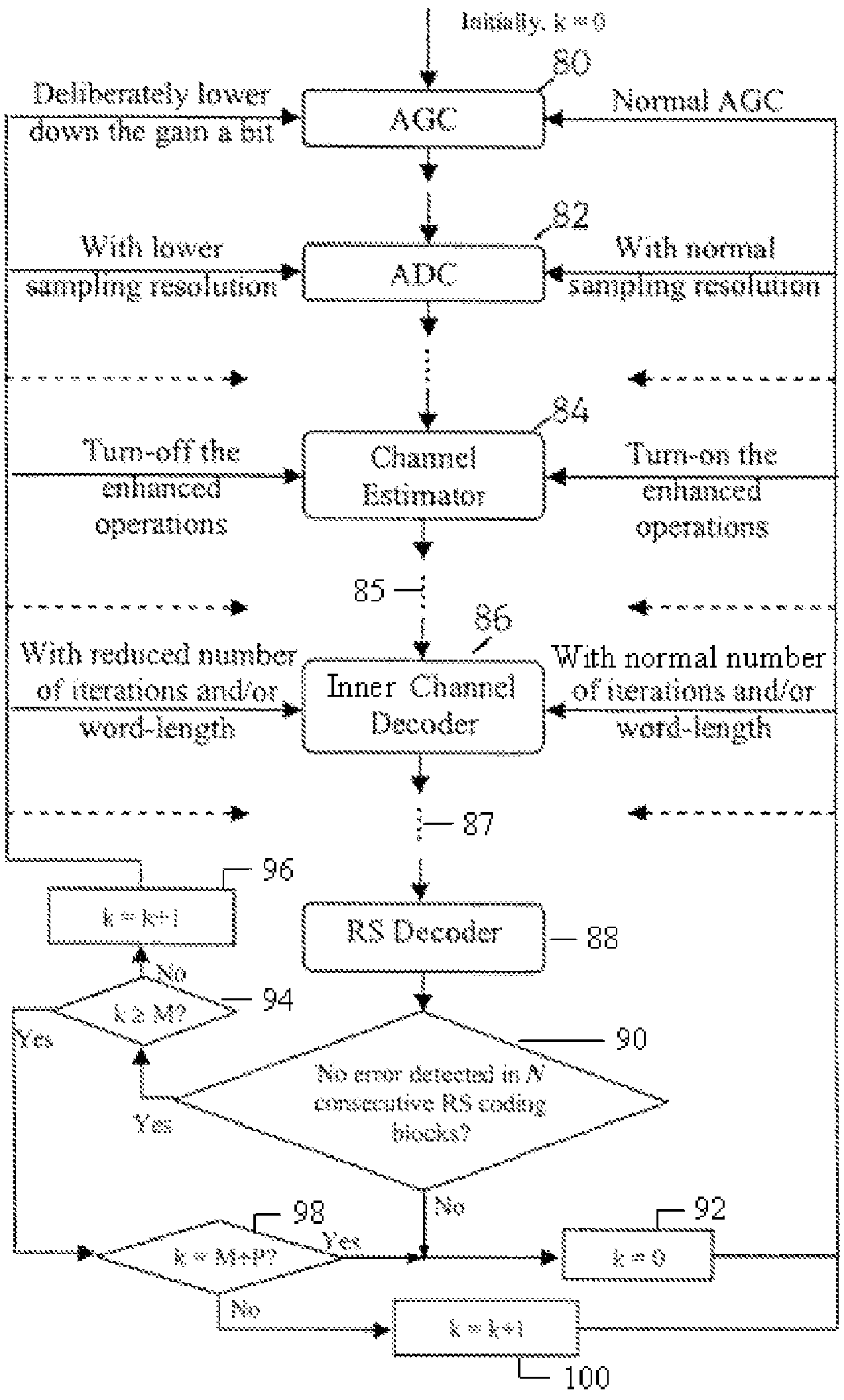
FIG. 4 illustrates an implementation of a power reduction scheme in the receiver of the DTT transceiver of FIG. 3.

A power reduction scheme is illustrated in FIG. 4. The receiver apparatus comprises an operational module configured to operate in a first mode and in a second mode, the apparatus being configured to switch operation of the module from the first mode to the second mode in dependence of an estimate of an environment (condition) of the channel. Examples of the operational modules of the receiver are the AGC 80, ADC 82, Channel Estimator 84 and Inner Channel Decoder 86 of FIG. 4. The apparatus may also have other operational modules depicted generally by 85, 87. An example of a first mode of operation for, e.g., ADC 82 is for the ADC 82 to operate with "normal" sampling resolution. The second mode of operation for ADC 82 is for the ADC 82 to operate with lower sampling resolution.

The receiver is configured to make a decision on whether to operate one or more of operational modules 80, 82, 84, 85, 86, 87 in the first or the second mode from a real-time assessment of the channel 50 conditions. One way of doing this is to monitor the error detection activities of the RS decoder (88 in FIG. 4), commonly adopted as the channel outer decoder in most DTT systems to estimate the channel environment or condition. Here, whether or not the receiver receives N error-free consecutive RS coding blocks (before error correction by RS, if any) is used as a decision criterion for assessing whether the channel environment is good or not good. If, at a time instant t, the receiver has received N or more than N consecutive error-free RS coding blocks, the current channel condition is assessed as "good". Otherwise, the current channel condition is assessed as "not good". Here, the value of N, which can be selected as a positive integer, controls the reliability of channel condition assessment. When N is selected small, the assessment result "the channel is not good" is more reliable than "the channel is good". Correspondingly, when N is selected large, the assessment result "the channel is good" is more reliable than "the channel is not good". When the receiver determines that the channel is in a "good" condition, the receiver switches one or more operational modules 80, 82, 84, 85, 86, 87 from the first mode of operation to the second mode of operation.

When continued monitoring of the channel is effected—i.e. an estimation of the channel environment is an ongoing process—the receiver is configured to toggle between first and second modes of operation in dependence of the continued estimation. Because of the reduction in complexity of the operational status of the receiver, embodiments of the receiver are configured to consume less electrical power when the module operates in the second mode of operation than when in the first mode of operation.

A detailed explanation of FIG. 4 is now given. Control variables M, N, P and k of FIG. 4 are defined as follows:

N is a predetermined minimum number of consecutive error-free RS coding blocks which are received at the receiver prior to a determination that the channel is in a "good" condition;

M is a predetermined maximum number of consecutive error-free RS coding blocks which are to be received in the second mode of operation prior to reverting to operation in the first mode of operation;

After operation in the second mode of operation, P is a predetermined minimum number of consecutive error-free RS coding blocks which are to be received in the first mode of operation prior to switching back to operation in the second mode of operation when the channel is in a "good" condition; and k is a count of error-free RS coding blocks received in a channel "good" condition (i.e. after receipt of N error-free blocks described above) and is used to control the process flow.

Initially, k is set to zero, and any or all of operational modules 80, 82, 84, 85, 86, 87 are operated in the first mode of operation. RS decoder 88 monitors the signal received over channel 50 for N consecutive error-free RS coding blocks at decision step 90. Before N consecutive error-free RS coding blocks are detected, the condition of channel 50 is considered to be "not good". As such, k is kept at zero at step 92 and the one or more operational modules 80, 82, 84, 85, 86, 87 are operated in the respective first modes of operation. Upon detection of the Nth consecutive error-free RS coding block at step 90, the apparatus determines that the channel is in a "good" condition, and switches operation of one or more of operational modules 80, 82, 84, 85, 86, 87 to the second mode of operation.

Power saving can be effected by replacing complicated operation of the operational modules 80, 82, 84, 85, 86, 87 with simpler operational modes when the channel is found to be good for signal transmission. That is, in one example, the first mode of the operational module is a normal mode of operation and the second mode of the operational module is a simplified mode of operation. In FIG. 4, the receiver implements the power reduction scheme for any or all of operational modules 80, 82, 84, 85, 86, 87 in a DTT receiver as examples for illustrating the concept. If the channel condition is determined to be good, the AGC 80 gain of low-noise amplifier (LNA) in the RF tuner 52 is set to operate with a second mode gain which is less than a first mode gain; that is, to a lower but yet acceptable level such that lower power consumption can be achieved. In one example, the ADC module 82 is configured to operate with a second mode sampling resolution which is less than a first mode sampling resolution; the sampling resolution in the second (simplified) mode of operation is less than the sampling resolution in the first (normal) mode of operation. Similarly, as the inner channel decoding may involve a certain number of iterations (e.g., with Turbo decoder) and/or require certain data resolutions (e.g., with a soft-decision convolutional decoder), the power saving can be achieved by reducing the iteration number and/or the word-length when switching modes of operation from the first mode to the second mode.

When in the second mode of operation, the apparatus will revert operation of the one or more operational modules to the first mode of operation in either of two ways. First, if an error is detected in an RS coding block, decision step 90 determines that N consecutive error-free coding have not now been received. Count k is then reset to zero at step 92 and the one or more operational modules are then switched back to the first mode of operation.

Secondly, to prevent any possible misjudgment due to, for example, baseband processing delay, and in order to make the channel adaptation still robust when it is not possible to make a clear distinction between good or not good channel conditions, a regular return to the first mode of operation (i.e. a more sophisticated processing state), even when the current channel conditions are found good, is performed. After determination at step 90 that the channel 50 is in a "good" condition, the apparatus checks at step 94 whether the number of the presently-received block is equal to M. In other words, the apparatus determines whether the maximum number of consecutive RS coding blocks in the second mode (i.e. simplified mode) of operation has been exceeded (k is equal to M). If the apparatus determines at step 94 that M has not been exceeded, then the one or more of operational modules 80, 82, 84, 85, 86, 87 continue to operate in the second mode and count k is incremented by 1 at step 96.

If no error is detected in the received RS coding blocks, the apparatus controller loops around steps 80/82/84/85/86/87, 88, 90, 94, 96 incrementing k in each loop until the apparatus determines that count of the presently-received RS coding block means that the number M has been reached (that is, k is equal to M) and proceeds to revert operation of the one or more operational modules 80, 82, 84, 85, 86, 87 to the first (normal) mode of operation.

When operation is switched back to the first mode, predetermined count P defines the number of RS coding blocks to be received in this iteration of operation of the one or more operational modules 80, 82, 84, 85, 86, 87 in the first mode. At step 98, the apparatus determines whether the kth received coding block means count k=M+P. If not, count k is incremented by 1 at step 100 and operation of the one or more operational modules continues in the first mode of operation.

Upon detection that k equals M+P, k is reset (i.e. forced to zero) at step 92, and the one or more operational modules 80, 82, 84, 85, 86, 87 of the apparatus continue operation in the first mode. However, in the next pass through step 90, the apparatus detects that k has been reset to zero. If the channel condition remains "good" then receipt of N error-free coding blocks at step 90 is immediately detected and operation of the one or more operational modules is switched back to the second mode of operation.

Thus, by monitoring the parameter k, a balance between quality of service (QoS) with power savings can be effected. Further, continued toggling between first and second modes of operation is controlled by prescribing the maximum number of consecutive RS coding blocks that can be received in the second mode, and the minimum number of consecutive RS coding blocks that should be received in the first mode; that is, with reference to counts M and P. Therefore, it can be seen that such a signal processing algorithm can control the apparatus to toggle operation of the one or more operational modules between first and second modes in dependence of the received coding blocks, not only between good and bad channel conditions, but also in a regular pattern when the channel is friendly to transmission.

It should be pointed out that, here, the choice of the parameters N, M and P depends on actual design requirements, as these parameters are the determinant factors for balancing the required power saving efficiency and the QoS to be provided. If N is selected small, M large and P small, more power saving can be achieved, but at the price of lower QoS, and vice versa. In actual implementation, these parameters can be predefined or be hardware-reconfigurable.

Thus, it is possible to reduce further the required $P_{BB}$ of a DTT receiver by making $P_{BB}$ adaptive to the actual channel environment. Given a high target of $C_b$, those algorithms which are usually of high complexity are most likely selected for achieving robust receiving under very bad channel conditions. The channel estimation algorithm, for example may need to be enhanced for fast fading channel conditions in a mobile environment. These enhanced algorithms, which are usually computationally expensive, are actually redundant in most situations such as when the user is moving slowly (e.g., pedestrian) and even still.

The channel estimation 84, which is a significant component for achieving acceptable system performance in a mobile environment, is now discussed as a detailed example of demonstrating the effectiveness of the proposed power saving scheme. As discussed above, this module may be switched from enhanced to simplified functionality to reduce power consumption.

In the DMB-T system, the channel estimation is per signal frame based and is performed in the time domain using the PN sequence of each Frame Sync 20, please refer to China Patent Application No. 200410009944.1, publication date: May 18, 2005 (Patent 944). Suppose that the channel impulse response (CIR) at the Frame Sync 20 of the $n^{th}$ signal frame has been estimated as $\hat{h}(n,N_0,l)$. Here, $N_0$ denotes the relative position of Frame Sync 20 in a signal frame 8 and l denotes the index of CIR taps. Assume that the first path is the main path of the channel 50, the channel frequency response (CFR) estimation at the $k^{th}$ subcarrier, $\hat{H}(n,N_0,k)$, over the Frame Sync 20 interval of the $n^{th}$ signal frame 8 can be obtained by performing a discrete Fourier transform (DFT) on $\hat{h}(n,N_0,l)$.

It can be seen that the CFR estimation achieved, $\hat{H}(n,N_0,k)$, can be used for equalising the Frame Body 22 of the $n^{th}$ signal frame provided that the channel 50 is invariant over the duration of a signal frame 8. However, this may not be always true in practice, as indicated in Patent 944. When the channel 50 is timing-varying over the duration of a signal frame 8, the following enhanced channel estimation described in Patent 944 may apply.

Assume that the channel 50 undergoes a linear variation over the period of a signal frame 8, the $k^{th}$ subcarrier's CFR, $\hat{H}(n,N_0,k)$, at the time instant of the $i^{th}$ data symbol of the $n^{th}$ Signal Frame Body 22 can be estimated by linear interpolation as:

$$\hat{H}(n,i,k)=\hat{H}_A(n,k)-a_i\hat{H}_D(n,k) \quad (3)$$

where $a_i$ is a linear function of i. Define:

$$\hat{H}_A(n,k)(\hat{H}(n,N_0,k)+\hat{H}(n-1,N_0,k))/2 \quad (4)$$

and:

$$H_D(n,k)=(\hat{H}(n,N_0,k)-\hat{H}(n-1,N_0,k))/2 \quad (5)$$

And let $X(n)=[X(n,1), X(n,2), \ldots, X(n,N_b)]$ and $Y(n)=[Y(n,1), Y(n,2), \ldots, Y(n,N_b)]$ be transmitted and received data vectors of the $n^{th}$ signal frame body 22, respectively. Also, let us define the diagonal matrices, $A=\text{diag}(a_1, a_2, \ldots a_{Nb})$; $U(n)=\text{diag}(\hat{H}_A(n,1), \hat{H}_A(n,2), \ldots, \hat{H}_A(n,N_b))$; and $V(n)=\text{diag}(\hat{H}_B(n,1), \hat{H}_B(n,2), \ldots, \hat{H}_B(n,N_b))$ with $\hat{H}_B(n,k)=\hat{H}_D(n,k)/\hat{H}_A(n,k)$. The system transmission thus can be modelled in the frequency domain as:

$$Y(n)=(I-T(n))\cdot U(n)\cdot X(n)+Z(n) \quad (6)$$

where Z(n) is a white Gaussian noise vector, and, $T(n)=WAW^HV(n)$ with W and $W^H$ being the DFT and inverse DFT (IDFT) matrices, respectively. Thus, the equalised $n^{th}$ signal frame body becomes:

$$\hat{X}(n)=U(n)^{-1}\cdot(I-T(n))^{-1}\cdot Y(n) \quad (7)$$

where I is an identity matrix. The actual implementation of equation (7) requires significant expense as it involves a very complicated matrix inversion operation, $(I-T(n))^{-1}$. The high complexity can be reduced by using the following approximation as:

$$(I-T(n))^{-1} \approx \sum_{i=0}^{Q} T^{i}(n) \quad (8)$$

As a result, the simplified equalization can be performed as:

$$X(n) \approx U(n)^{-\lambda} \cdot \left[ Y(n) + \sum_{i=1}^{Q} T^{i}(n)Y(n) \right] \quad (9)$$

Therefore, the receiver is configured to receive a signal frame of the transmitted signal, the signal frame comprising a frame body, and to perform, in the frequency domain, a simplified equalization of the frame body. Thus, embodiments of the receiver perform the simplified equalization of the frame body by performing an approximation of a matrix inversion operation.

Obviously, the above channel estimation and equalization can be easily incorporated into the proposed power reduction scheme, as a trade-off between system performance and computational complexity can be easily made simply by choosing a suitable Q value (i.e. number of iterations of the "T" process). Receiver designers can choose Q=0 in a case where the channel is good and increase it to 1 or an even larger value for fast varying channels. Note that, from equations (8) and (9), with an increment of 1, an extra "T" process is required. Since the "T" process involves both IDFT and DFT operations, significant power savings are expected by reducing one "T" process in this case. That is, the receiver performs the approximation of the matrix inversion operation in an iterative process, a number of iterations of the iterative process being determined in dependence of the estimate of the channel environment. The receiver may also transition between enhanced and simplified functionality of the channel estimator module by variation of the number of iterations of the iterative process.

Embodiments of the receiver are configured to operate with simplified functionality by performing the simplified equalization of the frame body instead of the normal equalization. Significant power reductions may still be realised in such implementations.

It should be emphasised that, although this particular example demonstrates the RS decoder's error detection capability to assess the channel conditions in this invention, the concept can be extended to other scenarios where the RS coding is replaced by another error detection/correction mechanism such as a cyclic redundancy check (CRC) or even low-density parity-check (LDPC) code. As long as the replacement has error detection capability, the power reduction scheme presented in this example remains valid.

Further, it will be appreciated that the invention has been described by way of example only and variations in design detail may be made without departing from the spirit and scope of the invention.

We claim:

1. A receiving apparatus for receiving digital video signals transmitted over a channel having a channel quality, comprising:

an operational module that is operable in either of a first mode and a second mode, the first mode being a normal mode of operation and the second mode being a simplified mode of operation;

an error detection module for detecting errors in the video signals received by the receiving apparatus, the error detection module being monitored to estimate the channel quality; and a decoder that generates coding blocks, wherein the operational module is operated in the second mode when the channel quality is estimated to be not good and is either operated in the second mode or periodically switched between the first and second modes when the channel quality is estimated to be good, and wherein the error detection module is monitored by counting consecutive coding blocks in which no errors are detected.

2. An apparatus according to claim 1, wherein the operational module is an automatic gain control module that is operated in the second mode with a gain which is less than in the first mode.

3. An apparatus according to claim 1, wherein the operational module is an analogue to digital converter module that is operated in the second mode with a sampling resolution which is less than in the first mode.

4. An apparatus according to claim 1, wherein the operational module is a decoder module that is operated in the second mode with a number of iterations and/or word length which is less than a number of iterations and/or word length when operating in the first mode.

5. An apparatus according to claim 1, wherein the operational module is a channel estimator module that is operated with enhanced functionality in the first mode and with simplified functionality in the second mode.

6. An apparatus according to claim 5, wherein the apparatus is configured to receive a signal frame of the transmitted signal, the signal frame comprising a frame body, and to perform, in the frequency domain, a simplified equalization of the frame body.

7. An apparatus according to claim 6, wherein the apparatus is configured to operate with simplified functionality of the channel estimator by performing the simplified equalization of the frame body.

8. An apparatus according to claim 6, wherein the apparatus is configured to perform the simplified equalization of the frame body by performing an approximation of a matrix inversion operation.

9. An apparatus according to claim 8, wherein the apparatus is configured to perform the approximation of the matrix inversion operation in an iterative process, a number of iterations of the iterative process being determined in dependence on the estimate of the channel quality.

10. An apparatus according to claim 9, wherein the apparatus is configured to transition between enhanced and simplified functionality of the channel estimator module by variation of the number of iterations of the iterative process.

11. A method for operating a receiving apparatus that receives digital video signals transmitted over a channel having a channel quality, the receiving apparatus including an operational module that is operable in either of a first mode of operation and a second mode of operation, the first mode being a normal mode and the second mode being a simplified mode of operation, the receiving apparatus additionally including an error detecting module for detecting errors in the video signals received by the receiving apparatus, said method comprising the steps of:

monitoring the error detection module to estimate the channel quality;

operating the operational module in the first mode when the channel quality is estimated to be not good; and operating the operational module in either the second mode or periodically switching between the first and second modes when the channel quality is estimated to be good, wherein the operational module is a channel estimator module that is operated with enhanced functionality in the first mode and with simplified functionality in the second mode.

12. A method according to claim 11, wherein the receiving apparatus additionally includes a decoder that generates coding blocks, and wherein the monitoring step comprises counting consecutive coding blocks in which no errors are detected.

13. A method according to claim 11, wherein the operational module is an automatic gain control module that is operated in the second mode with a gain which is less than in the first mode.

14. A method according to claim 11, wherein the operational module is an analogue to digital converter module that is operated in the second mode with a sampling resolution which is less than in the first mode.

15. A method according to claim 11, wherein the operational module is a decoder module that, when operating in the second mode, employs a number of iterations and/or word length which is less than in the first mode.

16. A method according to claim 11, further comprising receiving, at the apparatus, a signal frame of the transmitted signal, the signal frame comprising a frame body, and performing, in the frequency domain, a simplified equalization of the frame body.

17. A method according to claim 16, wherein the receiving apparatus is configured to operate with simplified functionality of the channel estimator by performing the simplified equalization of the frame body.

18. A method according to claim 16, further comprising performing the simplified equalization of the frame body by performing an approximation of a matrix inversion operation.

19. A method according to claim 18, further comprising performing the approximation of the matrix inversion operation in an iterative process, a number of iterations of the iterative process being determined in dependence of the estimate of the channel quality.

20. A method according to claim 19, wherein the receiving apparatus transitions between enhanced and simplified functionality of the channel estimator module by varying the number of iterations of the iterative process.

* * * * *